US010875237B2

(12) United States Patent
Rocher

(10) Patent No.: US 10,875,237 B2
(45) Date of Patent: Dec. 29, 2020

(54) DEVICE AND METHOD FOR PRODUCING THREE-DIMENSIONAL STRUCTURES CREATED IN SUCCESSIVE LAYERS

(71) Applicant: Xavier Rocher, Chatou (FR)

(72) Inventor: Xavier Rocher, Chatou (FR)

(*) Notice: Subject to any disclaimer, the term of this patent is extended or adjusted under 35 U.S.C. 154(b) by 465 days.

(21) Appl. No.: 15/536,728

(22) PCT Filed: Dec. 11, 2015

(86) PCT No.: PCT/FR2015/000226
§ 371 (c)(1),
(2) Date: Jun. 16, 2017

(87) PCT Pub. No.: WO2016/097498
PCT Pub. Date: Jun. 23, 2016

(65) Prior Publication Data
US 2017/0350115 A1 Dec. 7, 2017

(30) Foreign Application Priority Data
Dec. 16, 2014 (FR) ...................... 14 02869

(51) Int. Cl.
*B29C 64/106* (2017.01)
*B29C 64/232* (2017.01)
(Continued)

(52) U.S. Cl.
CPC ............ *B29C 64/106* (2017.08); *B28B 1/001* (2013.01); *B29C 64/209* (2017.08); *B29C 64/232* (2017.08); *B29C 64/236* (2017.08); *B29C 64/321* (2017.08); *B33Y 10/00* (2014.12); *B33Y 30/00* (2014.12); *E04B 1/161* (2013.01);
(Continued)

(58) Field of Classification Search
CPC ..... B29C 64/106; B29C 64/20; B29C 64/209; B29C 64/232; B29C 64/236; B29C 64/231; B28B 1/001; B33Y 10/00; B33Y 30/00; E04B 1/161; E04B 1/35; E04B 1/3505; E04B 2001/3588; E04G 21/0427; E04G 21/0445
See application file for complete search history.

(56) References Cited

U.S. PATENT DOCUMENTS 7,736,578 B2 6/2010 Ederer
2004/0124803 A1* 7/2004 Rodnunsky ............. B66C 13/08
318/649
(Continued)

FOREIGN PATENT DOCUMENTS

CN 103786235 * 5/2014
CN 103786235 A * 5/2014
FR 2739887 A1 4/1997

*Primary Examiner* — Kevin R Kruer
(74) *Attorney, Agent, or Firm* — MH2 Technology Law Group LLP

(57) ABSTRACT

A device for fabricating structures of large dimensions, layer by layer. The invention relates to a device making use of positioning an extrusion head in three dimensions by means of cables in order to deposit a pasty material continuously in thin layers, e.g. a mortar comprising either a hydraulic binder or thermoplastic compounds or thermosetting compounds or curable compounds. The invention is for making industrial elements of very large dimensions, and more particularly for making buildings.

14 Claims, 8 Drawing Sheets

(51) Int. Cl.
  *B29C 64/321* (2017.01)
  *B28B 1/00* (2006.01)
  *E04G 21/04* (2006.01)
  *E04B 1/35* (2006.01)
  *B29C 64/209* (2017.01)
  *B29C 64/236* (2017.01)
  *E04B 1/16* (2006.01)
  *B33Y 10/00* (2015.01)
  *B33Y 30/00* (2015.01)
  *B29C 64/20* (2017.01)

(52) U.S. Cl.
  CPC .............. *E04B 1/35* (2013.01); *E04B 1/3505* (2013.01); *E04G 21/0427* (2013.01); *E04G 21/0445* (2013.01); *E04B 2001/3588* (2013.01); *E04B 2103/02* (2013.01)

(56) References Cited

U.S. PATENT DOCUMENTS

| | | | |
|---|---|---|---|
| 2004/0206715 A1* | 10/2004 | Rodnunsky | B66C 21/04 |
| | | | 212/76 |
| 2005/0024004 A1* | 2/2005 | Rodnunsky | F16M 11/045 |
| | | | 318/649 |
| 2005/0024005 A1* | 2/2005 | Rodnunsky | B66C 13/08 |
| | | | 318/649 |
| 2005/0280185 A1 | 12/2005 | Russell | |
| 2009/0066100 A1* | 3/2009 | Bosscher | B25J 17/0266 |
| | | | 294/86.4 |
| 2013/0292039 A1* | 11/2013 | Peters | B29C 70/52 |
| | | | 156/168 |
| 2016/0121486 A1* | 5/2016 | Lipinski | B05B 13/005 |
| | | | 427/427.3 |
| 2017/0282297 A1* | 10/2017 | Ohno | B29C 67/00 |
| 2017/0350115 A1* | 12/2017 | Rocher | E04B 1/3505 |

* cited by examiner

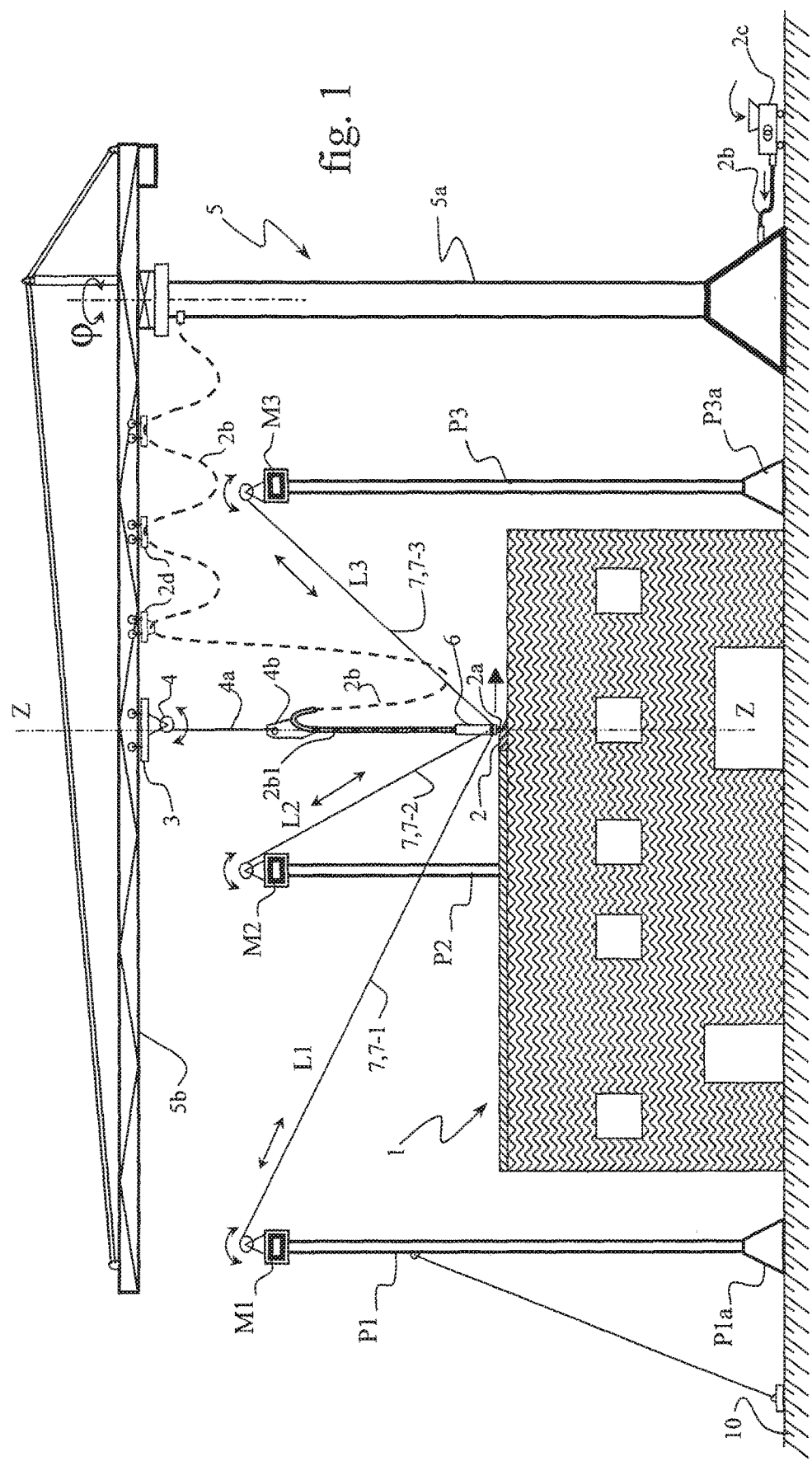

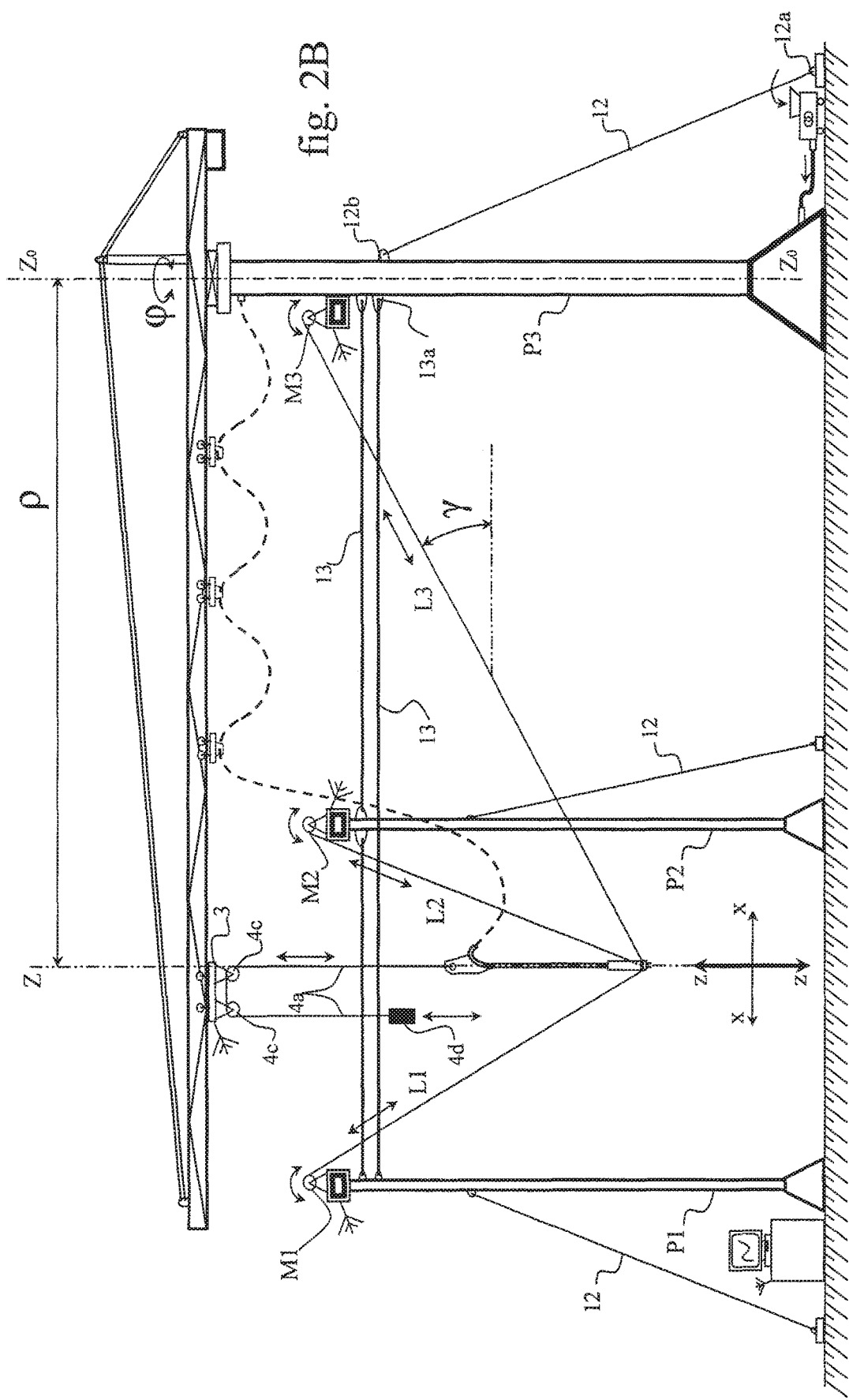

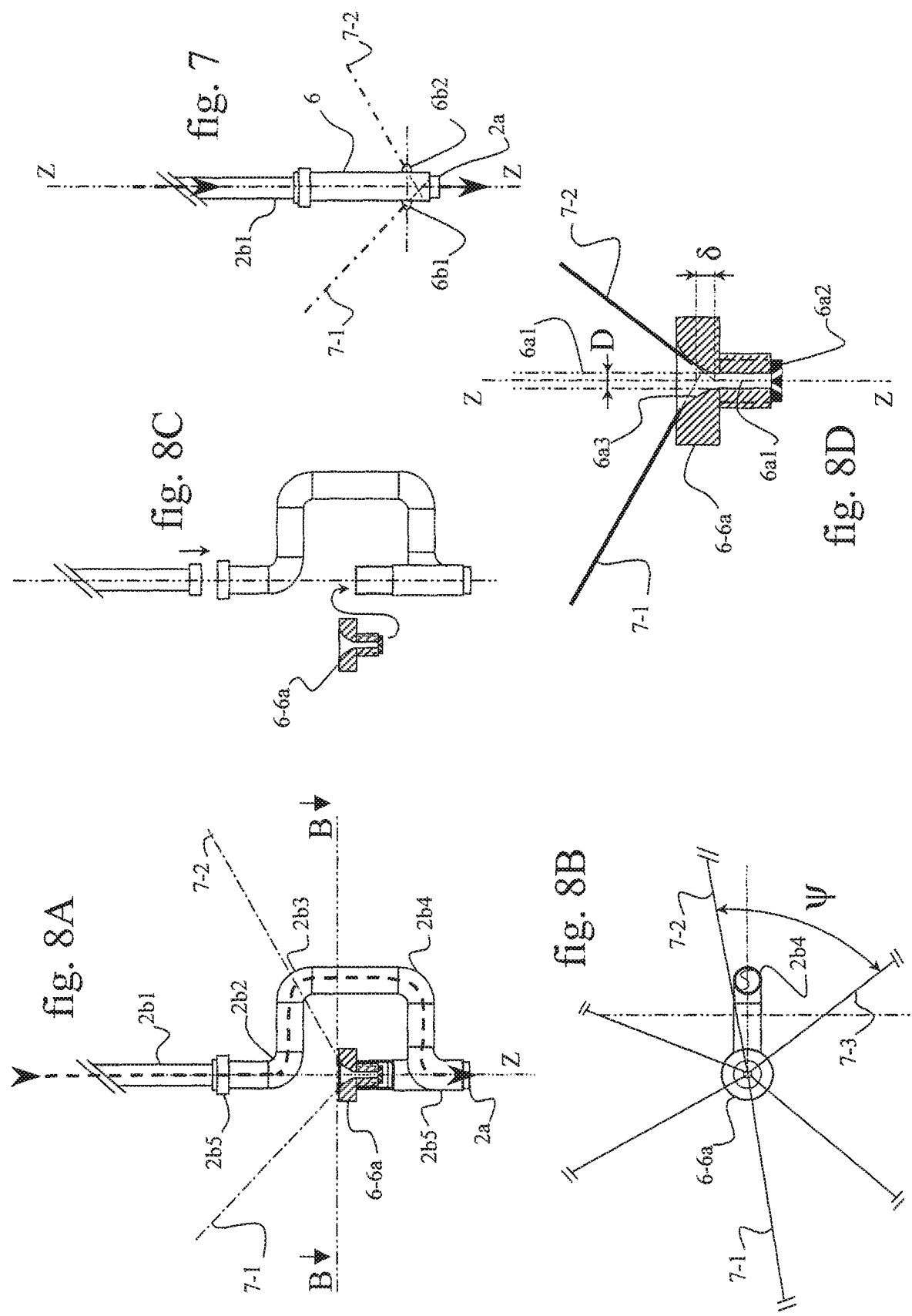

DEVICE AND METHOD FOR PRODUCING THREE-DIMENSIONAL STRUCTURES CREATED IN SUCCESSIVE LAYERS

TECHNICAL FIELD

The present disclosure relates to a device and to a method for fabricating three-dimensional structures from pasty or plastics substances spread in thin layers, for example, in superposed plane layers.

This type of device is known more particularly by the generic term "3D printer".

The present disclosure is intended more particularly for fabricating three-dimensional structures of very large dimensions, in particular in the field of masonry construction of buildings, i.e. construction using mortars comprising a hydraulic binder such as lightweight lime or cement, for example, mortars that are insulating and strong, and for example, fiber-reinforced.

BACKGROUND

In the field of 3D printers the term "structure" is used to designate prototypes or short runs of parts such as pump components, statuettes, bottles, or any other part that was used in the past to be molded or made entirely by hand, and that by virtue of these machines are now designed by computer in the form of digital 3D models and made in entirely automatic manner, layer by layer by said 3D printer.

In the field of construction, this involves making buildings, e.g. houses, blocks of flats or offices, warehouses, or any other type of construction requiring structures that are solid and that can be constructed quickly.

Construction techniques have changed a great deal in the last few decades, and it is always desired to simplify them and to automate them so as to increase the quality of the finished product while reducing costs and building times.

The principle of 3D printers is known, consisting in designing an object in three dimensions and then fabricating it layer by layer. To do this, the 3D digital model is cast as parallel slices of constant thickness and the machine deposits the pasty or liquid material successively layer by layer on each of the planes, and does so in a manner that is quasi-continuous. Depending on the technique involved, the material is deposited on the preceding layer either in the form of droplets, or in the form of a bead of molten plastics material and distributed by an injection head, or indeed by using a laser beam to melt a thin layer of previously deposited hot-melt powder, or by polymerizing a liquid film by using a laser beam.

It is generally desired to obtain good quality for the finished item, which leads to making layers that are thin, which in certain circumstances may be of the order of one hundredth of a millimeter thick, which may involve a considerable length of time to make parts having a volume of a few cubic decimeters.

That technique has recently been used in an attempt to make in the same layer-by-layer manner construction elements and small buildings by using robotic devices, either of the gantry type or else robots of the selective compliance articulated robot arm (SCARA) type, or indeed hexapod type robots, known to the person skilled in the art.

All of those devices are operated automatically from a digitally controlled controller, known to the person skilled in the art in the field of robotics and thus requiring little labor when making the structure.

Those techniques are well suited to prefabricating elements in a workshop or to making small works, but once dimensions become large, i.e. more than 5 meters (m), or 10 m, the devices become very large, since they need to be very accurate and thus very rigid.

Patent FR 2 739 887 in the name of the Applicant is known, which discloses a device that uses cables to position a tool in two dimensions on a wall that is immense, and more particularly on the facade of a work that is plane or slightly curved.

Devices are known that have been in use for more than ten years for moving a camera over a stadium above players or competitors in order to track sporting events closely. The device is constituted by four pylons generally situated at corners of the stadium, with fast winches installed at their top ends and controlled digitally in known manner, said winches being connected to the camera by fine cables, typically made of Kevlar, with the adjustment of the length of each of the cables serving to position the camera appropriately in a plane in order to obtain the looked-for images. By controlling the set of winches in real time, it is possible to make the camera travel over an area covering almost all of the stadium, and this can be done at speeds that can be impressive.

The positioning of the camera as performed in that way is not very accurate since the cables are under extreme tension to ensure that the camera remains above the athletes. The altitude of said camera is generally not very well controlled, and several accidents have been reported in the media, in particular collisions with athletes. In that application, accuracy is not of very great importance since the intended purpose is to position the camera approximately in order to obtain the hoped-for striking images.

Patent US 2013/0292039 is known, which describes a device for making 3D structures that is similar to the above-described cameras, the motor drives for the cables and the injection head together with the supply of material all being arranged at the moving head. In that application, the tensions in the cable are considerable, or even unacceptable if it is desired to fabricate elements of large dimensions, since all of the vertical forces are taken up by the cables connected to the stationary pylons.

Also known are patents WO 2005/097476 and EP 1 872 928, which describe a three-dimensional rectangular gantry for making three-dimensional structures of large dimensions. In that application, the horizontal beams of the three-dimensional fabrication gantry need to be very strong and thus to have a very large second moment of area in order to limit sagging under load in order to ensure that movements are accurate and repeatable. Those devices are described more particularly as being for prefabricating structural elements in a factory. Under such circumstances, the modularity and the considerable weight of the various elements are not suited for direct use on the site where the building is being constructed, since the equipment must be capable of being moved easily from one building site to another.

SUMMARY

The present disclosure seeks to obtain positioning with extreme accuracy in three dimensions XYZ, and more particularly in the vertical direction Z, which is the most difficult to control when the dimensions of the structure are large, or even immense. The present disclosure makes it possible to omit conventional installations of the scaffolding type or heavy structures of the gantry type, it being understood that such devices need to be extremely rigid in order to guarantee accurate positioning.

An object of the present disclosure is to provide an industrial device for fabricating structures of large dimensions automatically.

The present disclosure is a device for depositing pasty material for fabricating a three-dimensional structure of large dimensions layer by layer, the device comprising:

at least three first supports (P1, P2, P3) at a distance from the ground and not in alignment supporting three respective first cable tensioning devices (M1, M2, M3); and at least one second support (5b) kept at a distance from the ground (10), for example, above the first three supports, for example, suitable for being moved at least over the area between said three first supports; and a material feed pipe (2b), for example, filled with pasty substance, held suspended above the ground (10) and suitable for being moved at least over the area between said three first supports; and a deposition head, for example, an extrusion head (2a) at the end of said feed pipe (2b) suspended from a second tensioning device (4), for example, by a suspension cable (4a), for example, secured to a first carriage (3) suitable for being moved relative to said second support (5b); and three cables referred to as "positioning" cables (7, 7-1, 7-2, 7-3) of respective lengths (L, L1, L2, L3), each connected at one end to said deposition head, and each connected to a respective one of the three first tensioning devices (M1, M2, M3) at its other end, the three said positioning cables being suitable for being tensioned with different adjustable lengths by different actuation of the three first tensioning devices (M1, M2, M3) and of said second tensioning device (4), and being suitable by means of their adjustable lengths for defining an upside-down pyramid with a triangular top base, the bottom point of said upside-down pyramid defining a deposition point in three-dimensional space that is situated substantially at the deposition head at the bottom end of the feed pipe (2b), for example, kept substantially vertical, said deposition point being suitable for being moved in the three dimensions XYZ of three-dimensional space between the three pylons by different actuation of at least one of the three said first tensioning devices (M1, M2, M3), and for example, by moving said first carriage.

According to the disclosure, at least one of the first supports is a pylon (P), for example, a substantially vertical pylon, for example, anchored in said ground, and supporting a first winch (M).

It can be understood that the first supports supporting the first winches are not necessarily at the same levels as one another, and that they may be situated high up, being secured to an existing building, or that they may be constituted by pylons.

In the disclosure, said beam (5b) constitutes the boom of a tower crane (5) anchored to the ground (10), said boom supporting said first carriage and being movable in turning relative to the tower.

In a variant of the disclosure, the beam (20b-5b) constitutes the substantially horizontal beam of a gantry (20) that is movable along a horizontal axis YY, that is for example, perpendicular to the axis XX of the beam.

In a variant of the disclosure, the three first tensioning devices are actuated, and for example, said second tensioning device is actuated, and more for example, said first carriage is moved under digital control by a control station (8) for moving said deposition point.

In the disclosure, the suspension cable (4a) is kept vertical by adjusting the movements of the first carriage (3) along said boom and/or the movement of said boom in a horizontal plane in translation and/or in rotation, for example, under digital control from a control station (8).

In a variant of the disclosure, the suspension cable (4a) is kept vertical by adjusting the position in the horizontal XY plane of the first carriage (3) on the basis of information from two inclinometers (11) secured to said suspension cable (4a) or to said pipe (2b), said inclinometers being situated in two vertical reference planes, which are for example, mutually perpendicular.

The suspension cable (4a) is thus kept vertical by adjusting the position of the carriage corresponding substantially to the same pair of Cartesian coordinate values xy or of polar coordinate values (ρ) and angle (φ) corresponding to the pair of values xy.

In another variant of the disclosure, the feed pipe (2b) is suspended from said first suspension cable (4a) via a support for guiding the swan-neck type device, and the deposition head comprises a nozzle supported by a support guide (6) connected to said positioning cables (7).

In the disclosure, the first winch (4) is of controlled tension and supports 40% to 95%, for example, 70% to 85% of the total weight of the portion of the feed pipe (2b) that is suspended substantially vertically and is filled with pasty substance, plus the weights of the support guide (6), and of the nozzle (2a), possibly together with the weights of the swan neck (4b), of the suspension cable (4a), and of a pipe portion (2b) in a festoon configuration.

It can be understood that the first winch may support only the feed pipe 2b, the support guide 6, and the nozzle 2a, since the swan neck and the suspension cable do not exist in some variants.

In a variant of the disclosure, at least four pylons (P) are installed, respectively fitted with a plurality of four first winches (M) that are respectively connected to a said deposition head (2a) by a plurality of cables, three cables of said plurality of cables acting sequentially to perform the role of tensioned positioning cables, the other cables performing the role of secondary cables that are not tensioned.

In a variant of the disclosure, the feed pipe (2b1) passes around the support guide (6-6a), the support guide presenting an axial orifice of small diameter (6a1) onto which the set of positioning cables (7) converge.

The disclosure provides a method of fabricating three-dimensional structures from pasty substances deposited using a device of the disclosure, the method being characterized in that a said structure is fabricated by depositing a said pasty material in successive thin layers, for example, by extrusion, for example, in superposed horizontal layers by moving said deposition head, the three said positioning cables being tensioned with lengths (L1, L2, L3) that are adjusted by different actuation of the three first tensioning devices (M1, M2, M3) so as to define an upside-down pyramid of triangular top base, for example, substantially horizontal, the bottom point of said upside-down pyramid defining a point in three-dimensional space situated substantially at the deposition head, at the bottom end of the material feed pipe, said deposition point being moved in the three dimensions XYZ of the three-dimensional space between the three pylons by different actuation of at least one of the three first tensioning devices (M1, M2, M3) and for example, by moving said first carriage.

The disclosure is intended more particularly for fabricating structures having a smallest dimension in a horizontal plane of at least 5 m, for example, at least 10 m, for making a masonry construction.

In the disclosure, said pasty material is a mixture of inert substances such as clay, sand, straw, reinforcing fibers made of plastics material or of steel, and for example, including a hydraulic binder, such as a cement, so as to form a lightweight mortar that is strong and for example, insulating. In a variant of the disclosure, said pasty material comprises a hot-melt material or a thermosetting material comprising one or more components.

BRIEF DESCRIPTION OF THE FIGURES

Other characteristics and advantages of the present disclosure appear in the light of the following detailed description of embodiments given with reference to FIGS. 1 to 5:

FIG. 1 is a side view of a building being constructed with a device of the disclosure comprising a tower crane, three winches installed respectively at the tops of three pylons, and three respective cables connected to a mortar injection head supported by the carriage that is movable along the crane boom, a flexible hose delivering the mortar;

FIG. 2B is a variant of FIG. 2A in which the movable carriage supports a simple set of pulleys, the cable passing around said pulleys being connected to a counterweight;

FIG. 7 is a side view of a support guide having lugs for attaching positioning cables; and FIGS. 8A to 8D show a variant of the means for attaching the positioning cables to the support guide 6.

DETAILED DESCRIPTION

Figure 2A:
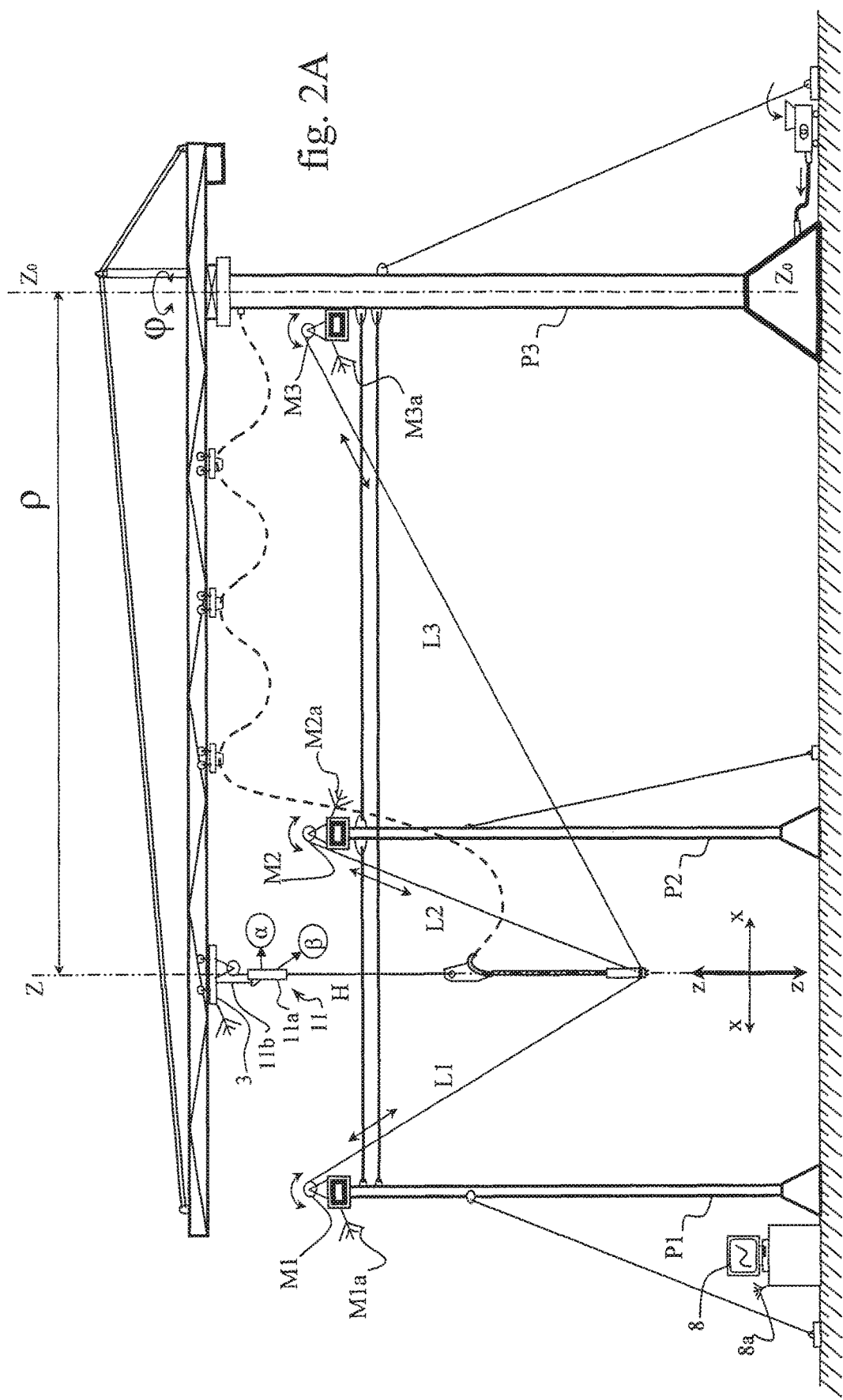
FIG. 2A is a side view of the device of the disclosure while it is being prepared, showing the means for stabilizing the pylons, guylines and tie rods connecting together the tops of said pylons, wherein a motor-driven winch secured to the movable carriage supports the injection head together with the flexible hose feeding mortar.

FIG. 1 is a side view of a building 1 under construction using a device of the disclosure. The device of the disclosure comprises:

- a tower crane 5 comprising a mast post 5a, a boom 5b, a first movable carriage 3 on the underside of said boom 5b and suitable for moving in translation along the axial direction of said substantially horizontal boom; and
- three pylons P1-P2-P3 positioned in a triangle close to the tower so that turning the boom 5b enables the movable carriage 3 to be placed above at least the area defined by said pylons; and
- a nozzle 2a suspended from the first carriage 3 by means of a cable 4a connected to a winch 4 secured to said first carriage 3; and
- a mortar feed pipe 2b fitted at its bottom end with a nozzle 2a for depositing mortar 2, said pipe being connected to a swan-neck type support 4b serving to support the mortar feed pipe 2b locally in a substantially vertical position, with the pipe thereafter being suspended in festoons to a plurality of second carriages 2d that are movable in translation on the underside along said boom 5b towards the pylon 5a of the tower crane, and then descending, for example, inside said pylon and exiting at the base of the pylon where it is connected to said mortar pump 2c.

The nozzle 2a is secured to a guide 6 connected to three cables 7-1, 7-2, and 7-3, which cables are connected at their other ends respectively to three winches M1, M2, and M3 that are situated, for example, at the same height, respectively at the tops of three pylons P1, P2, and P3 anchored in the ground 10 respectively at P1a, P2a, and P3a. Actuation of each of the winches M1-M2-M3 is digitally controlled from a control station 8 shown in FIG. 2A, with electrical power supply for the winches (not shown) running along each of the pylons, the instructions for actuating the winches and for moving the nozzles 2a being transmitted either via a shielded cable or optical fiber, or for example, by radio, as represented in FIG. 2A by antennas M1a, M2a, & M3a for controlling the respective winches M1, M2, and M3, with positioning orders being transmitted by the antenna 8a of the control station 8. Thus, the control station 8 serves to adjust the length L of each of the cables 7-1, 7-2, and 7-3, i.e. the lengths L1-L2-L3, between the support guide 6 and respective ones of the winches M1-M2-M3. The point of coincidence where said three cables meet is thus situated on the longitudinal axis of the support guide 6 and defines unambiguously an accurate point in three-dimensional space of coordinates xyz, said point of coincidence of the three cables being situated below the plane of said three winches. It is thus possible to move the guide 6, and thus the extrusion head or nozzle 2a, in all directions, i.e. in all three directions X, Y, and Z, by adjusting the respective lengths L1-L2-L3 of each of the three cables 7-1, 7-2, and 7-3 from the control station 8.

Figure 3:
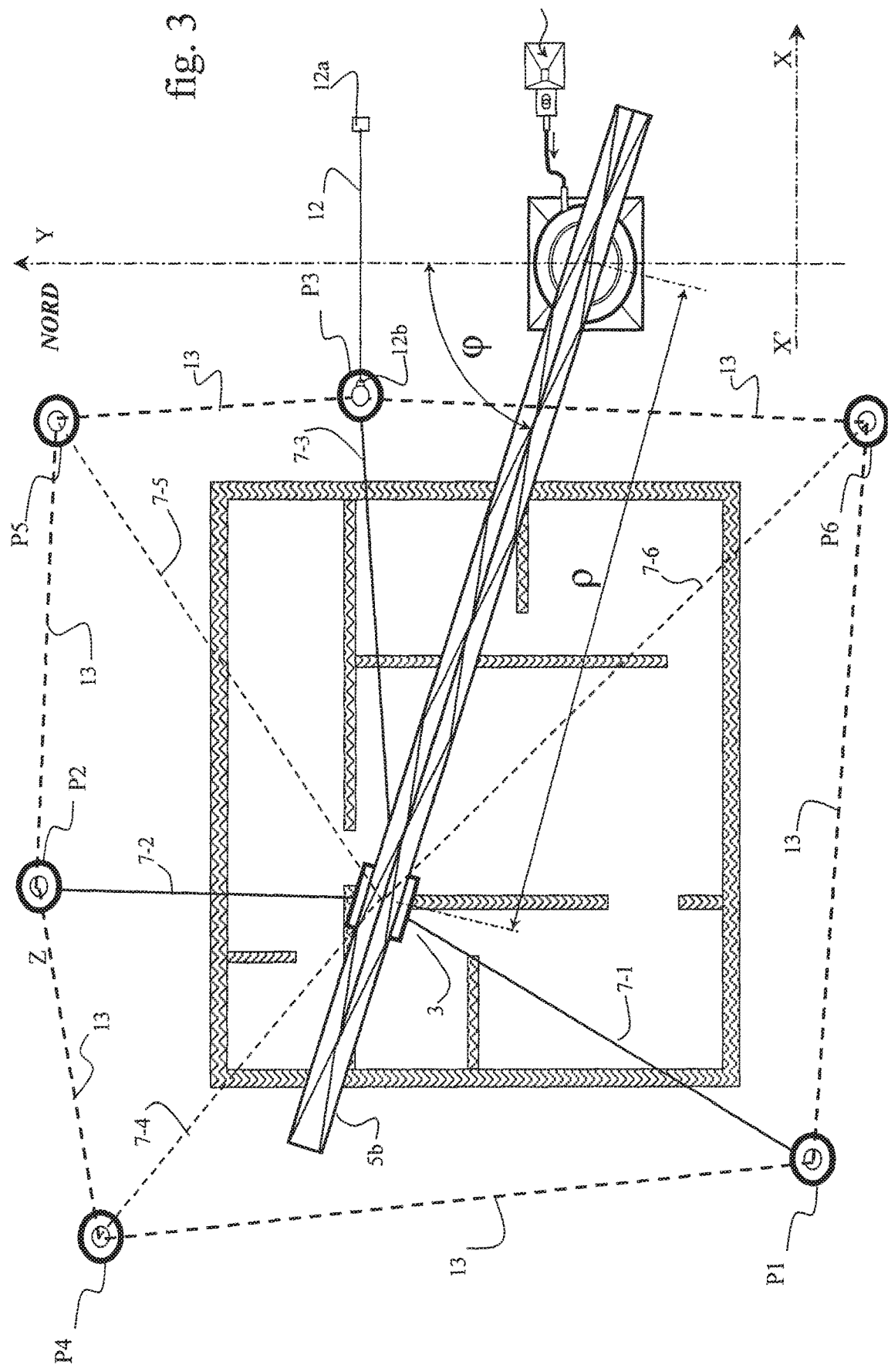
FIG. 3 is a plan view seen from above relating to FIG. 1 and showing the walls and the internal partitions of a building under construction, three cables 7-1, 7-2, and 7-3 being active, i.e. being positioning cables, while the cables 7-4, 7-5, 7-6 are secondary cables, and thus inactive for positioning purposes at the instant in question.

FIG. 3 shows a plan view of the top of the building under construction. The extrusion head, which is not visible since it is situated under the boom 5b of the crane 5 and under the first carriage 3, is positioned unambiguously in three dimensions by the set of three cables 7-1, 7-2, and 7-3. In this configuration, the extrusion head or nozzle 2a can be moved only inside the triangle formed by the three pylons P1-P2-P3. That is why a plurality of pylons, winches, and additional cables are added, namely three pylons P4-P5-P6 that are arranged in such a manner that the polygon defined by the set of pylons contains all of the building under construction. Only three of all these cables are used for accurately positioning the nozzle 2a, depending on the zone in which the structure is being constructed.

For this purpose, it is appropriate to consider two types of function, and thus of status, for each of said cables:

firstly there are cables referred to as "positioning" cables: such as the cables 7-1, 7-2, & 7-3 in FIG. 3, which act to determine unambiguously the three-dimensional position of the extrusion head 2a over a limited area inside a prism of vertical axis ZZ and of triangular section formed substantially by the three pylons P1-P2-P3; and secondly cables referred to as "secondary" cables since they do not participate in the three-dimensional positioning, such as the cables 7-4, 7-5, and 7-6 in FIG. 3, said cables then not being tensioned, and thus remaining slightly slack;

during the process of positioning the nozzle 2a over the entire area of the building, each of the cables can change status, it being understood that at any point in the three-dimensional construction space the extrusion head or nozzle 2a is positioned by three positioning cables selected sequentially from the set of cables, the other cables then temporarily having the status of secondary cables.

The term "secondary cable" is used herein to mean a cable in the non-tensioned state, i.e. a slack cable, so that the length L given to said cable by the control station 8 is slightly longer than the theoretical length $L_t$ that would be calculated for said cable to be a cable of the positioning cable type. For example, the slack of the cable may be adjusted to a value in the range 2 centimeters (cm) to 10 cm, i.e. the actual length of said secondary cable is then adjusted so that the value $L=L_t+2$ cm to 10 cm. It is then not under tension and therefore does not participate in positioning during this sequence. When that same cable changes status, i.e. when it returns to being a positioning cable, its length is adjusted to the value $L=L_t$. The cable will then be under tension and it will thus become one of the three cables participating in positioning during the new sequence.

It may be observed in FIG. 3 that the number of pylons could have been limited to four, since the polygon P1-P4-P5-P6 contains the entire building under construction. It is possible to reach any point of the construction with this limited number of pylons. Nevertheless, in certain circumstances, for reasons of accuracy in positioning, it is advantageous to add additional pylons in order to facilitate construction, e.g. with buildings of great length, i.e. buildings that are two, three, or four times longer than they are wide.

In FIG. 2B, the first carriage 3 is fitted with a set of idle pulleys 4c over which the cable 4a passes, there being a counterweight 4d fastened to the bottom left-hand end of that cable so as to compensate in part for the weight of the swan neck 4b, of the mortar feed pipe 2b, and of the guide 6, e.g. 70% to 85% of the total weight, which total weight varies depending on the altitude Z of the working plane and on the XY position. The remaining percentage of the total weight is taken up by the tension in said three positioning cables, with this tension providing the accuracy for said positioning.

Figure 5:
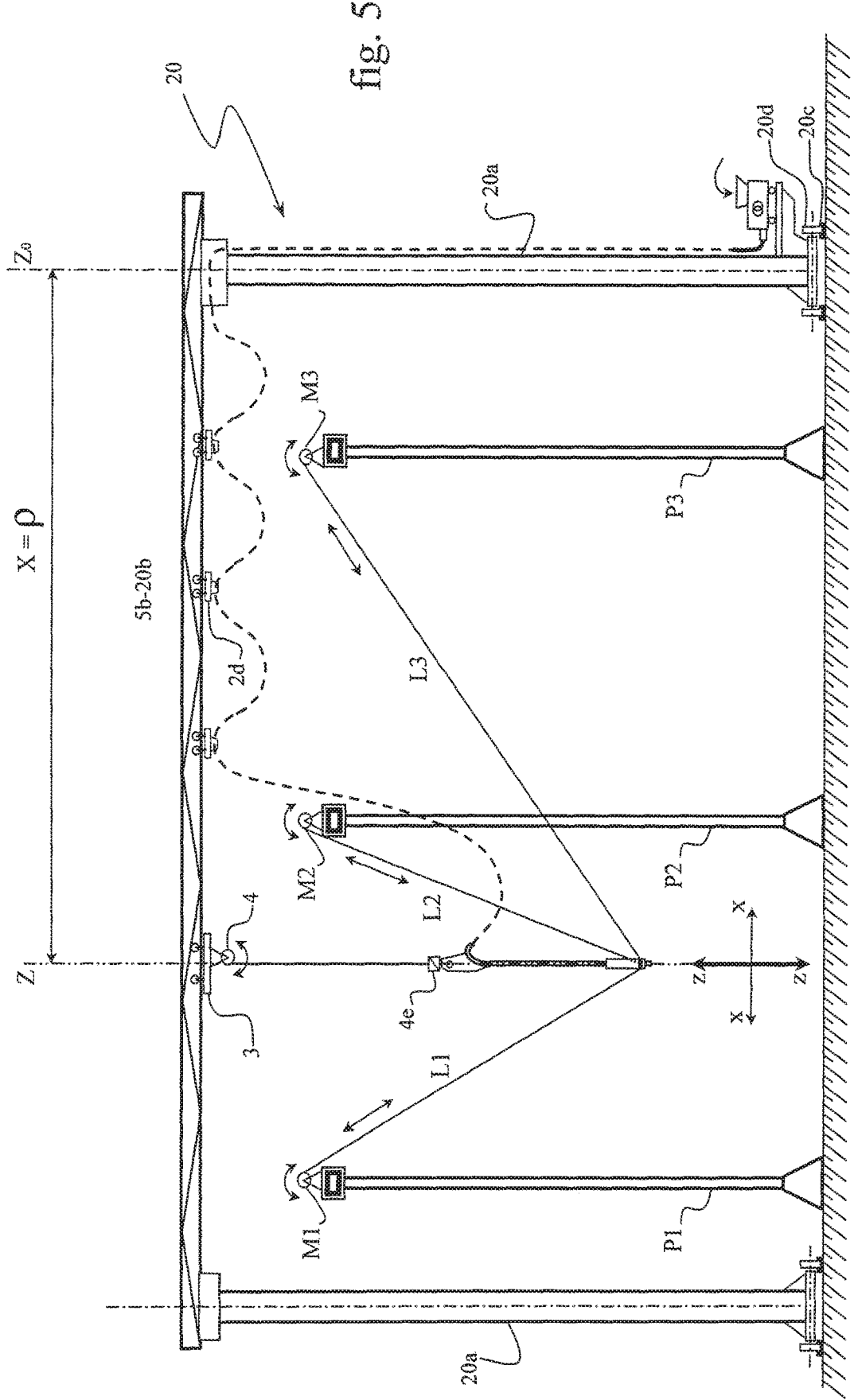
FIG. 5 is a side view of a device of the disclosure in which the tower crane is replaced by a gantry traveling on rails.

The tensioning may advantageously be monitored by a force sensor 4e located between the bottom end of the suspension cable 4a and the swan neck 4b, as shown in FIG. 5, the measured value of the force then making it possible to adjust the torque of the winch 4, and thus the tension in said suspension cable 4a.

The verticality of the cable is advantageously adjusted by the control station 8. For this purpose, since the xyz position of the extrusion head 2a is known, it is advantageous to adjust the values of the parameters of the tower crane, namely the polar coordinates ρ and φ so that they correspond very exactly to the xy coordinates of said extrusion head. For this purpose, the turning of the crane (angle φ) and the positioning ρ of the first carriage along the boom 5b are controlled in known manner by said control station 8.

In a variant of the disclosure, the verticality of the cable 4a is adjusted by a double inclinometer 11 shown in FIG. 2A. It is constituted by a tube 11a surrounding the cable 4a with small clearance, so as to allow said cable 4a to perform vertical movements. Said tube 11a is suspended from the first carriage 3 by cable 11b and is held in the vertical plane of the crane boom 5b without being free to turn about its vertical axis ZZ. A first inclinometer α measures the angle of the cable 4a relative to the vertical in a vertical plane containing the crane boom 5b, i.e. in the plane of FIG. 2A. A second inclinometer β measures the angle of the cable 4a relative to the vertical in the plane perpendicular to the vertical plane containing the crane boom 5b, i.e. in the vertical plane perpendicular to the plane of FIG. 2A. With these two angles being measured, action is taken on the polar coordinate ρ of the first carriage 3 in order to bring the value of the angle α to zero, i.e. said first carriage is moved forwards or backwards. In the same manner, action is taken on the polar coordinate φ of the crane boom in order to bring the value of the angle β to zero, i.e. the crane boom is turned either clockwise or counterclockwise. By continuously adjusting the polar coordinates of the first carriage 3 as a function of the values α and β, the cable 4a is to be found continuously in the desired substantially vertical position.

Figure 4:
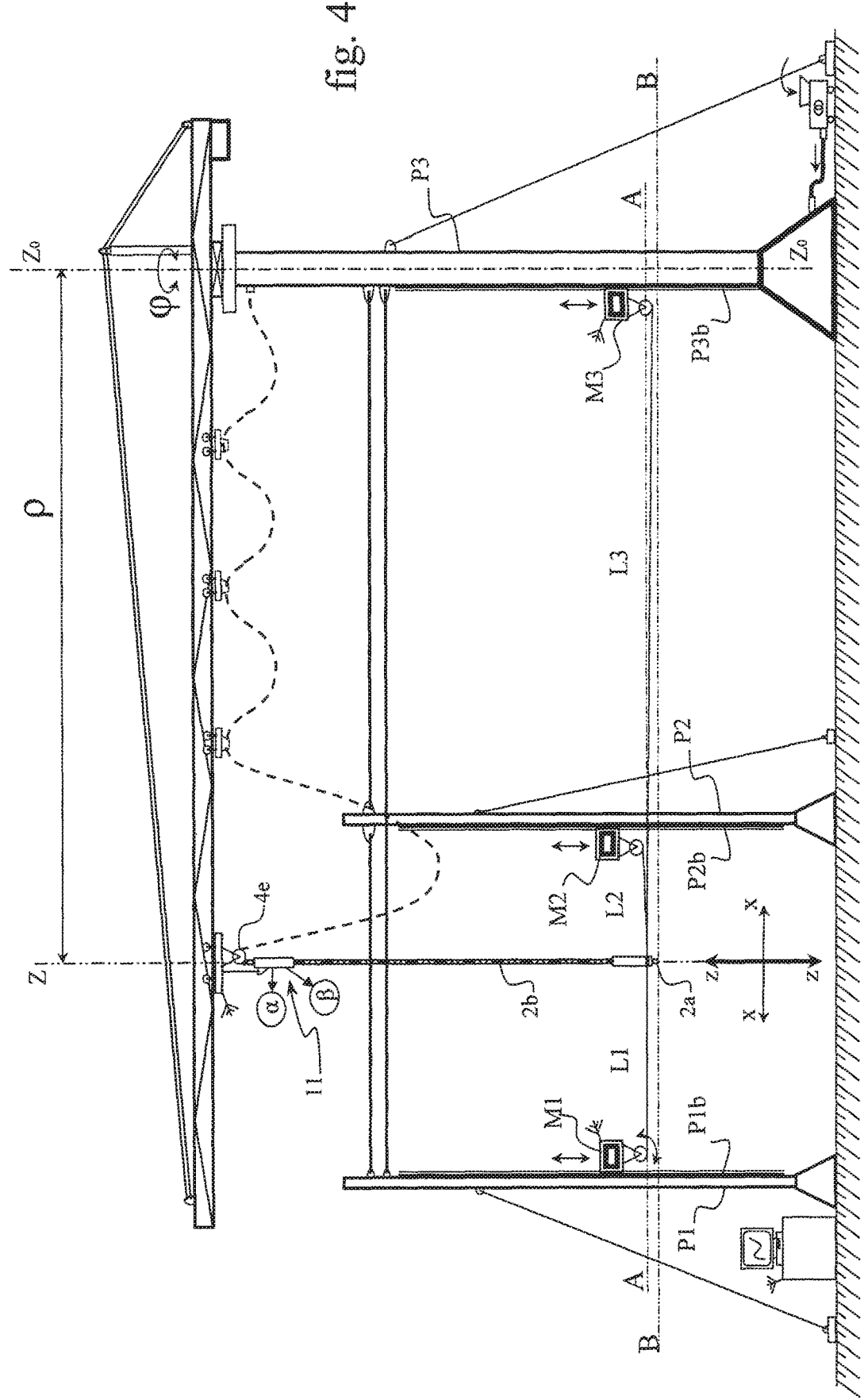
FIG. 4 is a side view of a device of the disclosure in which the motors move along the pylons so that the positioning cables remain substantially in a horizontal plane.

FIG. 4 shows a feed pipe 2b connecting the deposition head 2a to a motor-driven pulley 4e secured to the carriage 3, and leaving said pulley 4e in order to form suspended festoons under the beam 5b. The feed pipe 2b is kept under tension by said motor-driven pulley and the inclinometer 11 is then installed directly on said feed pipe and slides with small clearance thereover.

FIG. 4 is a side view showing a variant of the disclosure in which the three dimensioning cables are situated substantially in the same horizontal plane. The winches M1-M2-M3 are then vertically movable along respective racks $P_b$ (P1b, P2b, P3b) secured to each of the pylons P. Since the device works plane by plane, when there is a change of altitude Z, all of the winches are moved upwards so that all of the cables, i.e. the positioning cables and the secondary cables, remain substantially in the same plane. Under such circumstances, it is appropriate to consider that two of the three dimensioning cables are actually used for positioning purposes, while the third cable under tension serves to ensure that the positioning is in the plane AA; the other cables then have the status of secondary cables and they are kept slack, i.e. without significant tension.

Thus, in this variant described with reference to FIG. 4, the configuration is planar and similar to using cables for positioning on a facade in two dimensions, with the entire weight of the swan neck 4b, of the mortar feed pipe 2b, and of the guide 6 being supported by the winch 4 secured to the first carriage 3. Adjusting the length of the cable 4a then makes it possible to keep the end of the extrusion head or nozzle 2a in the mortar deposition plane BB.

This variant of the disclosure may use multiple pylon-rack-winch assemblies that are vertically movable and thus more complicated to construct and to control, and it therefore does not constitute a variant of the disclosure.

In FIG. 5, the tower crane is replaced by a gantry 20 constituted by two substantially vertical pillars 20a interconnected by a horizontal beam 20b supporting the first carriage 3 together with the second carriages 2d supporting the mortar feed pipe 2b in the festoon configuration. The pillars 20a of the gantry move along the axis YY perpendicular to the XZ plane of the figure on motor-driven wheels 20d running on rails 20c. By adjusting the y position of the gantry along the YY axis in controlled manner, and also the ρ=x position of the first carriage 3 along the beam 20b, the cable 4a is maintained in a position that is substantially vertical, in the same manner as described above with reference to FIGS. 1 to 4. Nevertheless, the layer-by-layer movement of the extrusion head or nozzle 2a over the entire area of the building under construction may involve continuous movements of the entire gantry. Such a gantry is of considerable size, both in height and in width, and it needs to present great rigidly so as to be capable of being moved without danger, and above all so as to be capable of withstanding strong winds in the event of a storm, even if not in operation. It is thus of considerable weight, which weight needs to be subjected to incessant movements using drive motors of considerable power.

Advantageously, and as shown in FIGS. 2B and 3, the rigidity of the set of pylons is considerably improved by installing guylines 12 anchored in the ground of 12a at one end and anchored at the other end 12b on a respective pylon P, for example, in the top third of said pylon P. Likewise, the pylons P are secured to one another, for example, at the tops of the pylons, by tie rods 13 installed between each adjacent pair of pylons in the polygon formed by the set of pylons. Each tensioner 13 is secured to a respective pylon at each of its ends 13a. In these figures, the means for tensioning the guylines 12 and the tie rods 13 are not shown. In FIG. 3, only one guyline is shown for the pylon P3 only.

To ensure the best positioning effect, i.e. the best centering effect of the positioning cables, as shown in FIG. 2B, the angle γ of each positioning cable 7 relative to the horizontal must lie in the range 10° to 80°, and for example, in the range 25° to 70°. Specifically, for angles of about 10°, the weight of the elements supported by the cable 4a when resolved as forces in each of the three positioning cables, leads to high levels of force in each of the cables, which goes against the looked-for purpose, i.e. great accuracy and limited forces. Likewise, for angles of the order of 80°, the forces resolved in the three positioning cables give rise to forces that are small or even very small, thereby considerably reducing the centering effect, and thus the accuracy of the positioning.

In FIGS. 2A, 2B, and 4, use is advantageously made of the mast post 5a of the crane 5 to perform the function of the pylon P3.

By way of example, in order to construct a building that is 15 m high, 15 m long, and 12 m wide, a tower crane is installed, for example, a self-erecting crane of Manitowoc-Potain (France) model IGO 21 type possessing an under-hook height of 19 m and a boom length of 26 m, or a larger model such as the IGO 50 model possessing an under-hook height of 23 m and a boom with length of 40 m.

The crane has its hook-support carriage modified by being fitted with a linear coder so as to enable the distance ρ to be adjusted automatically, and also a rotary coder on the substantially vertical axis of the mast post of said crane in order to adjust the angle φ of said mast post relative to north, as shown in FIG. 3. Six pylons P1-P6 that are 18 m high are arranged as shown in FIG. 3 and fitted with digitally controlled winches, each situated at the top of a pylon. The positioning cables connecting the extrusion head guide to each of said winches have a diameter of 4 mm, and for example, of 3 mm or even 2 mm. The guide 6 and the extrusion head or nozzle 2a weigh about 5 kilograms (kg) to 10 kg. The suspension cable 4a is a cable having a diameter of 6 mm, and it is connected to the first carriage 3 via the swan neck 4b supporting the mortar feed pipe 2b, which feed pipe is constituted by a flexible hose having an inside diameter of 30 mm and weighing substantially 2.5 kilograms per linear meter (kg/m) when full of mortar.

The device then deposits a layer having a thickness in the range 1 cm to 4 cm along the selected path at a continuous speed of 0.1 meters per second (m/s) to 0.25 m/s.

The positioning cables and the secondary cables 7 are of small diameter, since the forces required for holding the extrusion head or nozzle 2a in an extremely accurate position are very low throughout the entire duration of the construction process. Likewise, the cable 4a supporting part or all of the vertical load of the swan neck, a portion of the pipe, the guide 6, and the extrusion head 2a is of small diameter, since the forces in question are very small.

The very small forces, a few kilograms, or possibly a few tens of kilograms, in the positioning cables 7 apply very limited forces to the tops of the pylons P, so they bend very little, thereby guaranteeing great accuracy in the positioning of the extrusion head 2a in three dimensions X-Y-Z. Furthermore, since the positioning cables are of very small diameter, they are practically insensitive to wind, and since their linear weight is also very small, they take uplines that are almost straight between the winches M and the extrusion head 6, thereby guaranteeing extreme overall rigidity and thus extreme accuracy in the positioning of the extrusion head 2a, which can thus be moved in fully controlled manner so as to make, layer by layer, all of the walls and partitions of the building, as can be seen in FIG. 3.

This disclosure is described in the context of constructing buildings of large dimensions, however it is very advantageous for making all types of construction out of pasty or plastics materials presenting sufficient cohesion after a few seconds or a few minutes to make it possible to proceed layer by layer, for example, in layers that are substantially horizontal, so that the layer that has been made is sufficiently firm when the following layer is applied. This avoids localized or complete collapses of the structure, and the structure can be made automatically and continuously with a minimum of labor, thus making it possible to reduce the cost of construction considerably.

Figure 6:
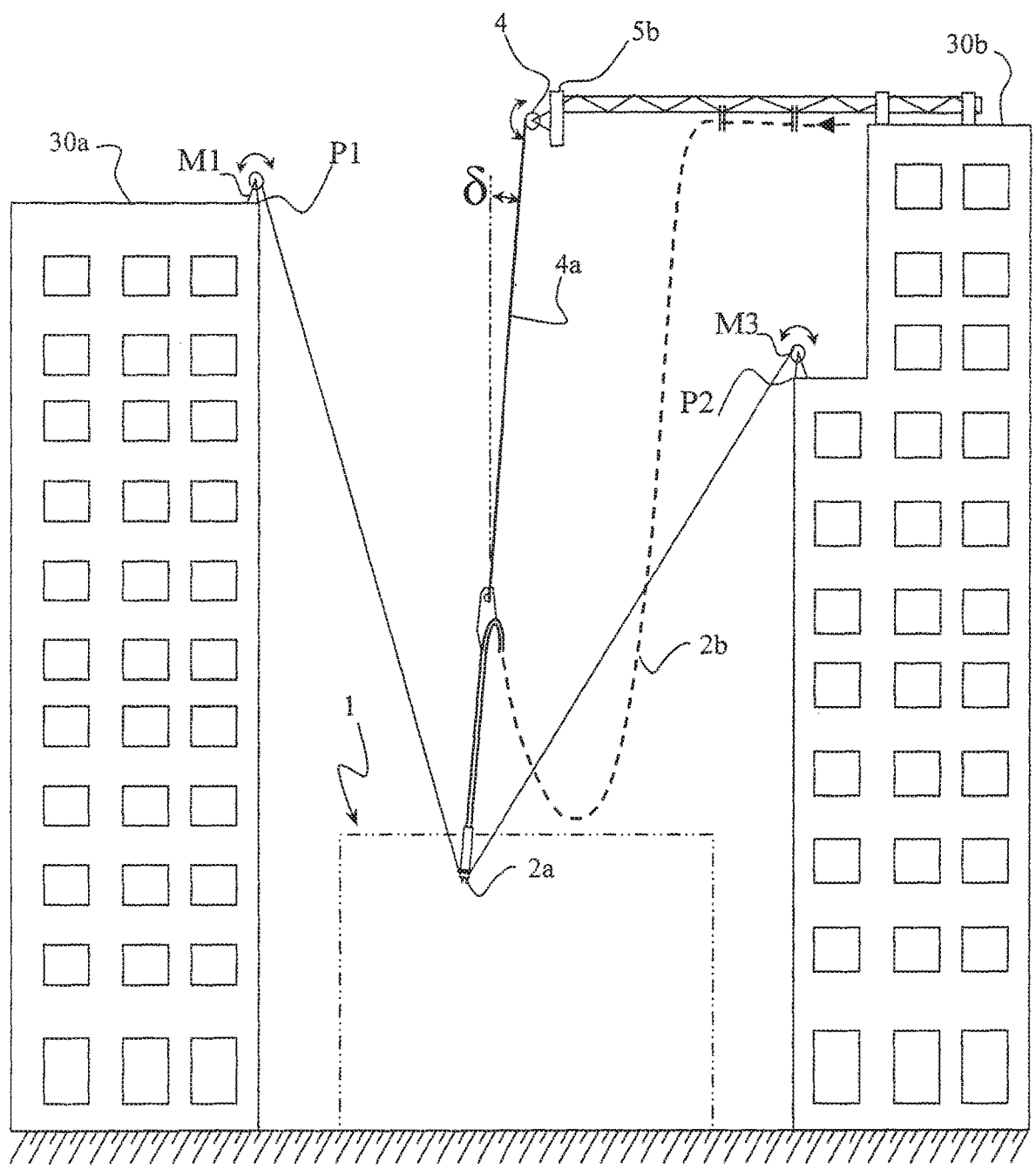
FIG. 6 is a side view of a device of the disclosure in which the winches are installed on existing buildings, the feed pipe being suspended from a stationary point.

In a variant of the disclosure shown in FIG. 6, the structure to be constructed lies between two buildings 30a and 30b, and use is advantageously made of the highest and most distant points of said existing buildings for installing supports for the winches M. Such anchor points present a great advantage in terms of rigidity and simplicity, compared with the above-described pylons P.

In another variant of the disclosure, also shown in FIG. 6, the suspension cable 4a and its tensioning system 4 are suspended from a stationary point, for example, situated at a very great altitude vertically over the geometrical center in the XY plane of the structure under construction, e.g. at an altitude that is greater than two to five times the greatest dimension of said structure in the horizontal plane, plus the height of said structure. Thus, during movements of the deposition head 2a, the cable 4a is no longer vertical, but describes a cone of horizontal section perpendicular to its vertical axis that corresponds to the outline of the structure under construction, with the angle at the apex of said cone varying, depending on the position of the deposition head 2a, in the range δ=0° to δ=10° to 15°, or even more. In this configuration, the point at which the pasty material is deposited is no longer very exactly vertically below the bottom end of the upside-down pyramid, but is slightly offset. This offset does not significantly disturb the construction process since the offset is only a few millimeters or possibly one or two centimeters, providing use is made of a stationary point that is situated at very great height, as mentioned above. Furthermore, said offset is the same layer after layer and can be corrected by modifying the path to be followed by said deposition head 2a simply within the control device 8.

For structures of medium or small dimensions, the tower crane may be replaced merely by a builders' hoist comprising a pylon 5a with a bearing at its top secured to a beam 5b that is substantially horizontal. A carriage 3 that is free to travel along said beam supports a hoist 4 supporting the cable 4a. The beam 5b is free to turn at the top of the pylon: the movements of the deposition head 2a entrain the cable 4a, which is no longer vertical, and makes an angle δ with said vertical. The horizontal component created by this angle δ in the hoist acts both in the carriage, which then moves naturally along said beam 5a, and on the beam of angle φ relative to the north that varies automatically so that said angle returns substantially to zero, i.e. so that the cable is substantially vertical. The larger the angle δ, the greater the return effect. The residual angle, i.e. the angle that does not give rise to any movement of the carriage 3, nor of the beam 5a, is of the order of 3° to 5° and does not significantly reduce the accuracy of positioning and disturbs the construction process very little.

The winches M are described as being installed at the tops of the pylons P or on the structures of existing buildings, however they could also be installed in any other position, e.g. on the ground; under such circumstances, the cables 7 connecting the guide 6 to the winches need to be deflected by idle pulleys installed at the tops of the pylons or at the tops of existing buildings.

As shown in FIG. 1, the suspension cable 4a, the feed pipe 2b1, the support guide 6, and the nozzle 2a are situated on the same substantially vertical axis ZZ under the effect of the weight of the various elements. As a result, the attachment points of the cables need to be situated on the outside wall of the support guide 6. In FIG. 7, there can be seen a said support guide 6 connected to the positioning cables 7-1 and 7-2 via lugs 6b1 and 6b2. Because the diameter of said support guide is large, e.g. in the range 60 mm to 100 mm, the center lines of said tension cables intersect at a point that varies relative to the axis ZZ of said support guide during movements of the head. This variation in the horizontal plane constitutes a positioning error, but is always less than the radius of said support guide; furthermore, it is additional to variation in the height of said point of intersection relative to the actual positioning of the nozzle. To mitigate this drawback, which can lead to positioning errors of 25 mm to 60 mm, or even more, it is advantageous to use the device described with reference to FIGS. 8A to 8D. As shown in FIG. 8D, the cables 7-1 and 7-2, and other positioning cables, if any, converge on the axis of the support guide 6a, penetrate into a hole of small diameter 6a1 passing axially through said support guide, and then through a pierced plate 6a2 where said cables are held in position by a device that is not shown. The top face 6a3 is advantageously funnel-shaped with a radius of curvature such that said positioning cables never come into contact with a sharp edge. Since the diameter D is small, e.g. 8 mm to 10 mm, or even less, errors due to variations in the point of intersection are reduced drastically compared with the situation shown in FIG. 7, where the reference diameter lies in the range 60 mm to 100 mm. These variations are specifically of the order of a few millimeters, and can therefore be considered as being negligible.

To ensure that the suspension cable 4a, the feed pipe 2b1, and the nozzle 2a remain together on a common vertical positioning axis ZZ under the effect of the weight of the various elements, the feed pipe 2b1 is advantageously deflected at the support guide 6. This deflection is shown in FIG. 6A and is for example, undertaken in a vertical plane by means of a plurality of bends 2b2-2b3-2b4-2b5 associated with straight portions of pipe. FIG. 8B is a section in plane BB of FIG. 8A and shows the limited interference between the positioning cables 7 and the deflection of the pipe 2b1 in the zone of the support guide 6. A rotary joint 2b5 shown in FIG. 8A is advantageously installed so that the avoidance device constituted by the bends 2b2-2b5 can turn freely whenever it interferes with any one of two adjacent cables, namely 7-2 or 7-3.

This disclosure is described for making structures using pasty substances, and more particularly mortars based on cements or on lime, however it can advantageously be used for making metal structures by localized melting of a metal wire, such as an iron or a bronze wire, using localized and powerful heater means, such as a plasma torch, titanium inert gas (TIG) welding, or a laser. For this purpose, the heater means take the place of the nozzle 2a, and the electrical power or laser beam together with the metal being transferred by means of an umbilical taking the place of a pipe 2b for feeding pasty substances. As they advance, the localized heater means can thus melt the previously deposited layer N and the additional metal so as to form the layer N+1, which solidifies quickly while waiting for the layer N+2 to be made during the next pass. Such a device is particularly suitable for making works of art, such as for example statues, or any other constructional or decorative element of large dimensions.

The invention claimed is:

1. A device for depositing pasty material for fabricating a three-dimensional structure layer by layer, the device comprising:
   at least three first supports positioned at a distance from the ground and not in a straight line, supporting three respective first tensioning devices; and
   at least one second support kept at a distance from the ground and supporting a second tensioning device; and
   a material feed pipe held suspended above the ground and suitable for being moved at least over an area between said three first supports; and
   a deposition head at the end of said material feed pipe, wherein at least the deposition head is suspended from said second tensioning device by a suspension cable; and
   three cables of respective lengths, each connected at one end to said deposition head via a support guide, and each connected to a respective one of the three first tensioning devices at its other end, said three cables being suitable for being tensioned with different adjustable lengths by different actuation of the three first tensioning devices and of said second tensioning device, and being suitable by their adjustable lengths for defining a deposition point in three-dimensional space that is situated substantially at the deposition head at the bottom end of the feed pipe, said deposition point being suitable for being moved in the three dimensions XYZ of three-dimensional space between the three first supports by different actuation of at least one of the three said first tensioning devices.

2. The device according to claim 1, wherein at least one of the first supports is a substantially vertical pylon, anchored in said ground.

3. The device according to claim 2, wherein each of the first tensioning devices is movable along a respective pylon to remain substantially in a horizontal plane.

4. The device according to claim 1, wherein said second support is a substantially horizontal beam of a gantry that is movable along a horizontal axis.

5. The device according to claim 1, wherein said second support is a boom of a tower crane anchored to the ground, said boom supporting a first carriage and being turnable around said tower crane.

6. The device according to claim 5, wherein the three first tensioning devices are actuated, said second tensioning device is actuated, and said first carriage is moved under digital control by a control station.

7. The device according to claim 5, wherein the suspension cable is kept vertical by adjusting the movements of the first carriage along said boom and/or adjusting the movement of said boom in translation and/or in rotation in relation to a horizontal plane.

8. The device according to claim 5, wherein the suspension cable is kept vertical by adjusting the position in the horizontal plane of the first carriage based on information from two inclinometers secured to said suspension cable or to said material feed pipe, said inclinometers being situated in two vertical reference planes.

9. The device according to claim 1, wherein the material feed pipe is suspended from said suspension cable via a support for guiding a swan-neck type device, and the deposition head comprises a nozzle supported by said support guide connected to said cables.

10. The device according to claim 1, wherein at least four said first supports which are pylons are installed, wherein said first supports are fitted with a plurality of first tensioning devices that are respectively connected to a said deposition head by a plurality of cables, three cables of said plurality of cables acting sequentially to perform the role of tensioned positioning cables, and the other cables performing the role of secondary cables that are not tensioned.

11. The device according to claim 1, wherein the feed pipe passes around the support guide, the support guide presenting an axial orifice of a first diameter onto which the positioning cables converge.

12. A method of fabricating three-dimensional structures from pasty substances deposited using a device according to claim 1, wherein said structure is fabricated by depositing a said pasty material in successive thin layers by moving said deposition head, the three said positioning cables being tensioned with lengths that are adjusted by different actuation of the three first tensioning devices so as to define a reference point in three-dimensional space situated substantially at the deposition head, at the bottom end of the material feed pipe, said deposition point being moved in the three dimensions XYZ of the three-dimensional space defined by the three first supports by different actuation of at least one of the three first tensioning devices and by moving the supporting guide supporting the deposition head and holding the material feed pipe in a position that is substantially vertical.

13. The method according to claim 12, wherein structures are fabricated having a smallest dimension in a horizontal plane of at least 5 m for making a masonry construction.

14. The method according to claim 12, wherein said pasty material is a mortar comprising a mixture of a hydraulic binder and inert substances selected from the group consisting of clay, sand, straw, and reinforcing fibers made of plastic material or steel.

* * * * *